Dec. 27, 1927.
G. D. ANGLE
1,653,689
CAM SHAFT AND ACCESSORY DRIVE FOR ENGINES
Filed Feb. 7, 1925     3 Sheets-Sheet 1
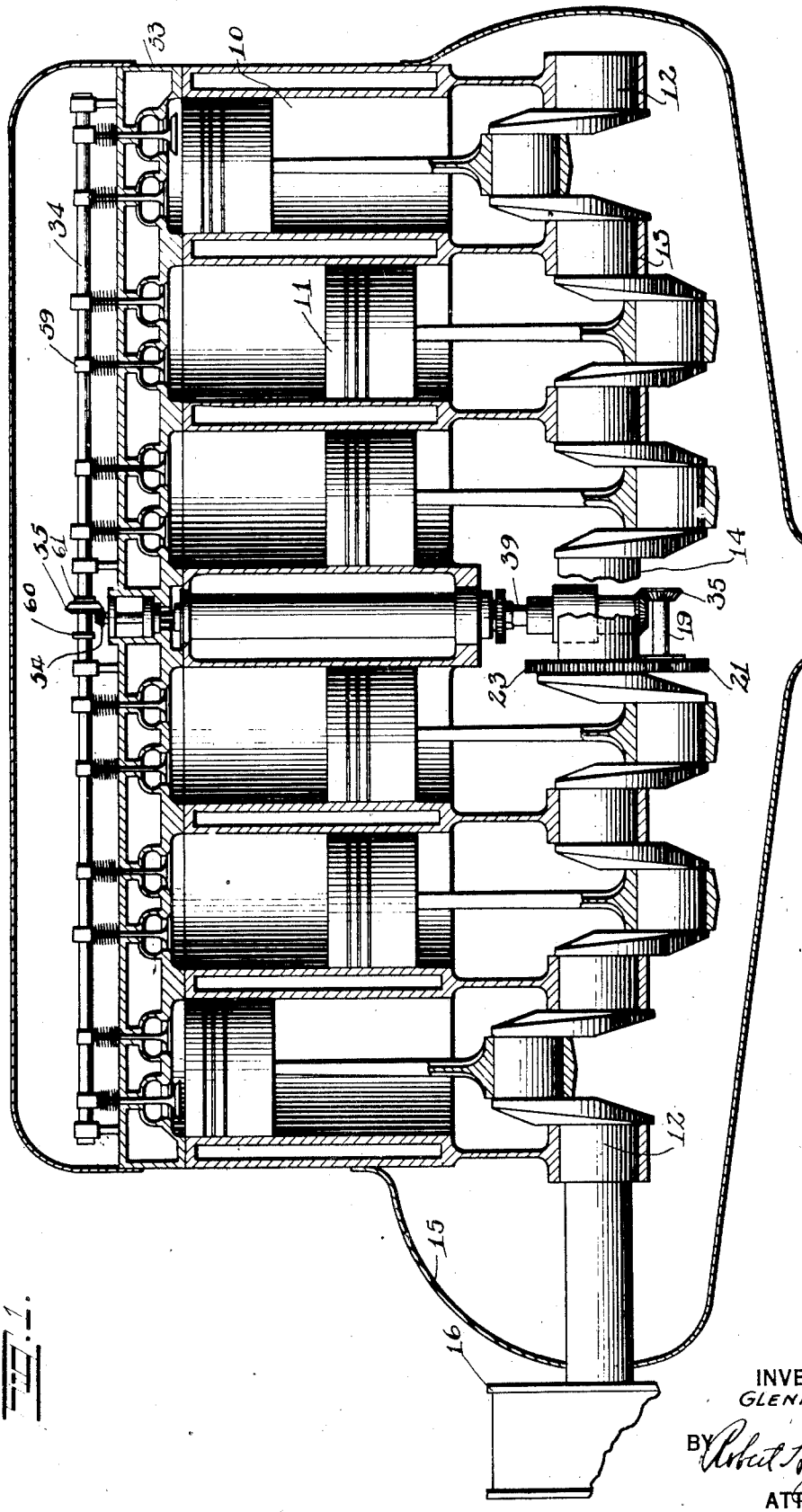
INVENTOR
GLENN D. ANGLE
BY
ATTORNEY

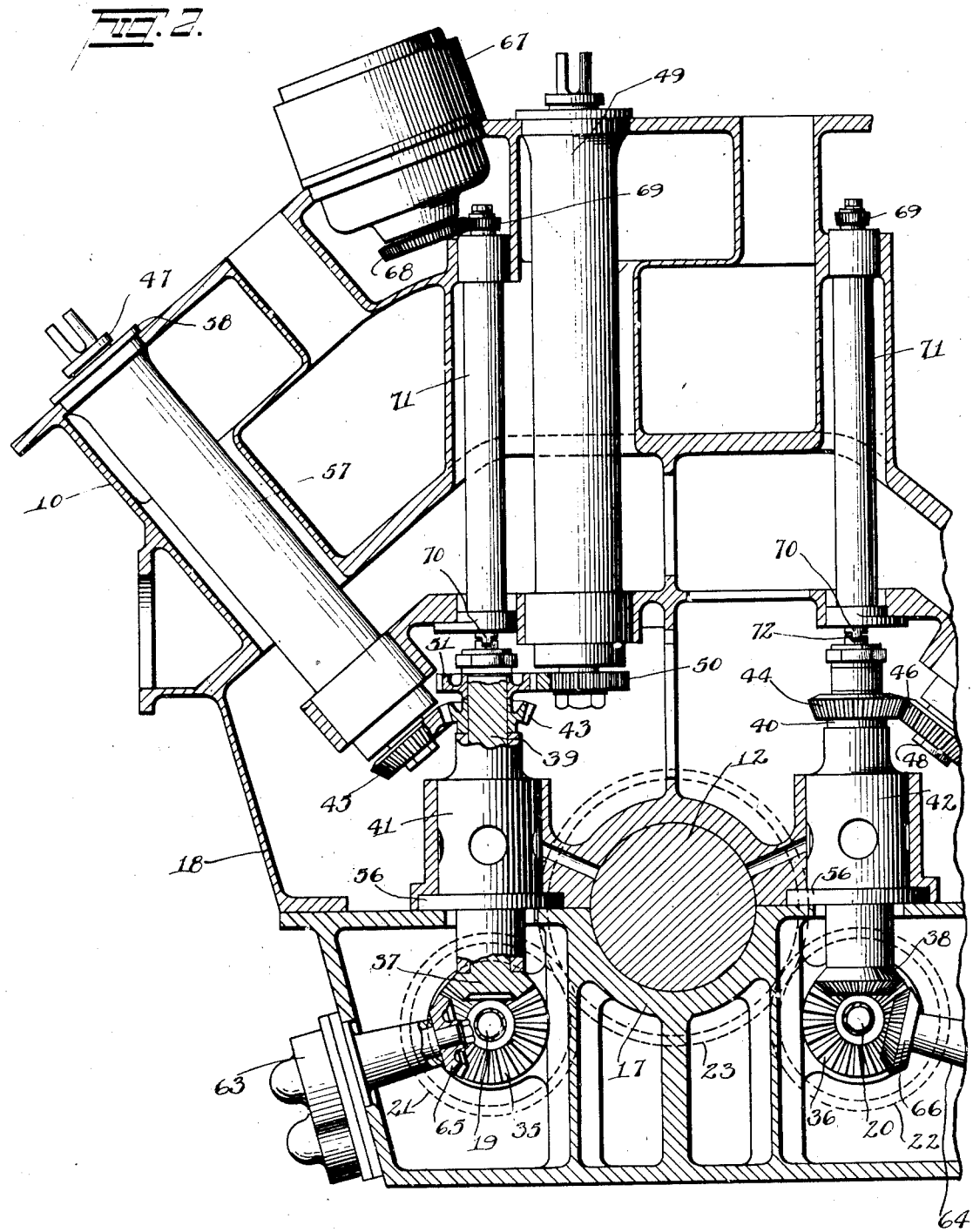

Dec. 27, 1927.
G. D. ANGLE
1,653,689
CAM SHAFT AND ACCESSORY DRIVE FOR ENGINES
Filed Feb. 7, 1925
3 Sheets-Sheet 3
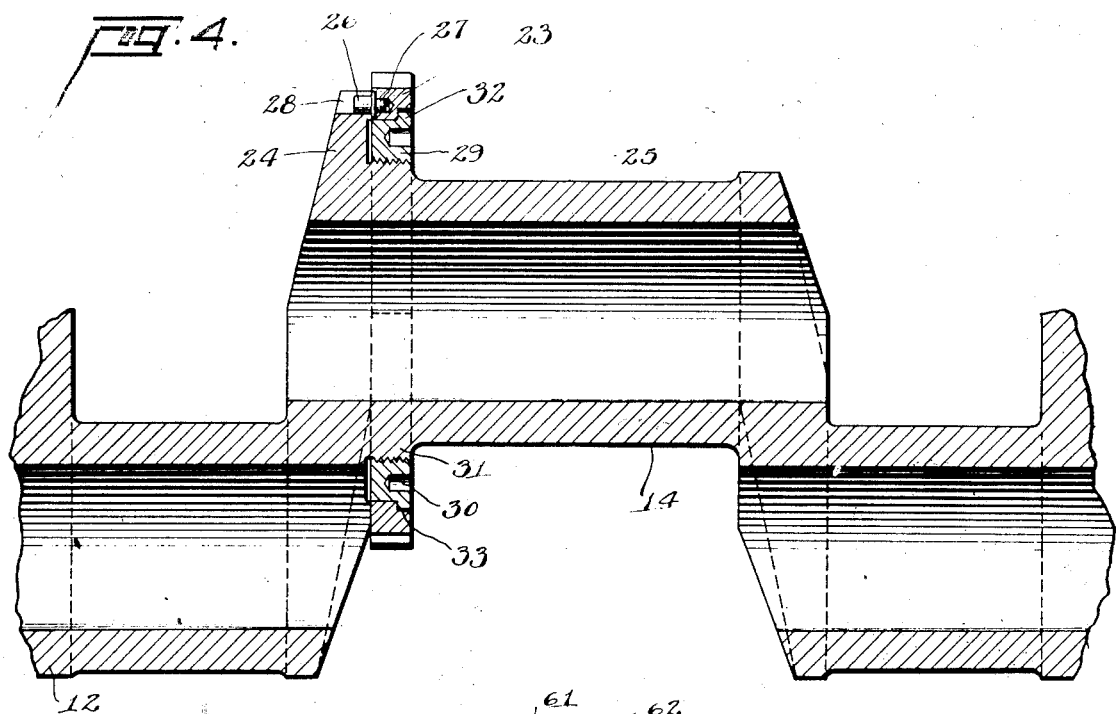
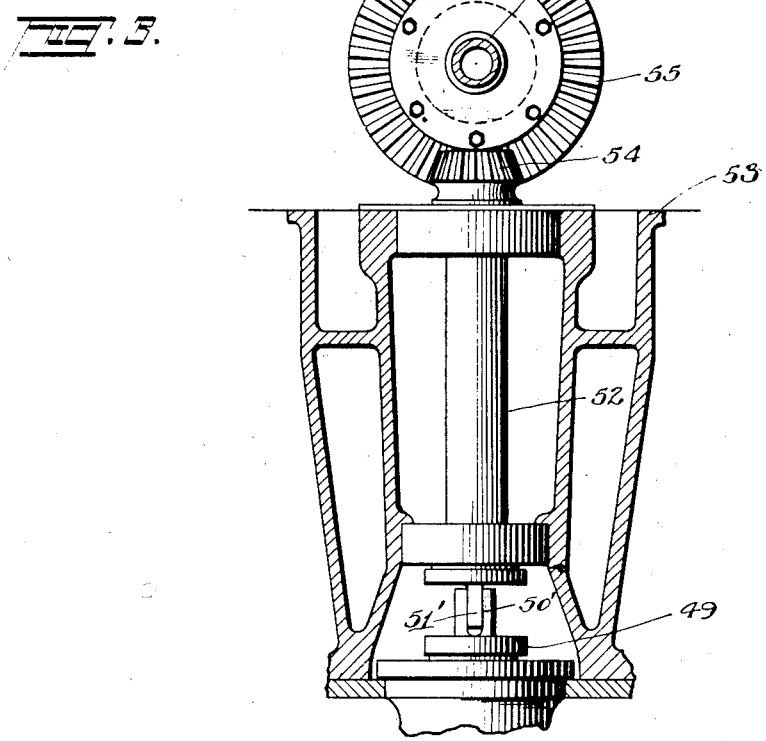
INVENTOR
GLENN D. ANGLE
BY
ATTORNEY Patented Dec. 27, 1927.

1,653,689

UNITED STATES PATENT OFFICE.

GLENN D. ANGLE, OF DETROIT, MICHIGAN.

CAM-SHAFT AND ACCESSORY DRIVE FOR ENGINES.

Application filed February 7, 1925. Serial No. 7,534.

This invention relates to a camshaft and accessory drive for engines, more particularly of the V or W type.

The principal object of the invention is to provide an arrangement minimizing the number of gears required for driving the camshafts and auxiliary units, such as oil pumps and magnetos of these types of engines, it being further an object to centrally locate the drive at the middle main bearing of the crankshaft, to utilize the space between the front and rear sets of cylinders necessitated by the central main bearing, in order to reduce the overall length of the engine while at the same time securing the advantage in driving the camshafts at the middle thereof, and thereby eliminate the bad effects of uneven torque on the camshafts which hitherto affected the valve opening and closing periods where the shafts were driven from one end.

Another object of the invention consists in providing a compact arrangement of accessory drives for the magnetos and oil pumps of the engine, and providing for the easy assembling and disassembling of these units.

The foregoing and other objects will be brought out in the course of the following description, in which reference is made to the accompanying drawings, wherein Fig. 1 is a central vertical longitudinal section through an engine embodying the features above described.

Fig. 2 is a transverse section on an enlarged scale.

Fig. 3 is a further enlarged sectional detail of a part of the camshaft drive not shown in Fig. 2.

Fig. 4 is an enlarged sectional detail of the engine crankshaft showing the timing gear mounted on the middle thereof.

The present invention has particular reference to a camshaft and accessory drive for W type engines, consisting of eighteen cylinders usually, although certain features are incorporated which may find utility in engines of the V type or other engines having a lesser number of cylinders. The cylinders 10 are all cast en bloc in three banks. The pistons 11 are connected to a heavy crankshaft 12 having crankcase bearings 13 of a normal width at each of the cylinders in the front and rear sets of cylinders, and having a single large central bearing at 14 between the front and rear sets of cylinders. The present engine, being designed particularly for use on aircraft, has the crankshaft extending forwardly through the crankcase 15 to receive a propeller on the coupling 16. It will be understood, so far as the application of the present invention is concerned, it is equally well adapted for use on automobile engines of either a V or W type. The middle bearing 14 has a cap 17 which is secured to the underside of the engine block 18 within the crankcase 15. The cap 17 extends the width of the crankcase and provides bearings for a pair of stub shafts 19 and 20, arranged in parallel relation on opposite sides of the crankshaft. These shafts have spur gears 21 and 22 meshing with a large spur gear 23, secured upon the crankshaft 12 at the middle main bearing 14. The gear 23 will hereinafter be referred to as the timing gear, inasmuch as it is the primary drive gear for the camshaft, and operates with the crankshaft at crankshaft speed to drive the camshafts at half engine speed. It will be noted that the gear reduction for accomplishing this end is provided between the gears 21 and 22 and the timing gear.

The timing gear 23 is in the form of a ring gear of sufficiently large diameter to pass over the cheeks of the crankshaft from one end to the middle thereof where the crank cheek 24 is enlarged on one side of the main bearing pin 25 of the crankshaft to provide an abutment to which the gear may be secured. The gear is located by a small pin 26 set in a location hole 27 in the gear 23 which engages in a notch 28 in the crank cheek 24. A gland nut 29 formed in two pieces has spanner holes 30 whereby the halves may be threaded together over the threaded portion 31 on the crank pin 25 within the gear 23. The annular flange 32 on the nut 29 engages in an annular recess 33 in the gear 23 and serves to hold the gear in place alongside the crank cheek. The pin 26 serves during the tightening operation to prevent the gear from rotation with respect to the crank, out of its proper position of angularity relative thereto. After the nut is tightened the pin is under no shear due to the load on the gear, all of this load being consumed in the tightening of the nut. It will be observed that the nut when tightened takes up no additional room beyond that occupied by the gear itself so that practically the full length of the crankshaft bearing pin is supported in the bearing 14.

The camshaft 34 of each of the banks of cylinders extends the length of the engine and provision is made for a direct driving connection at the middle of the engine from the timing gear 23, as will presently appear. The stub shafts 19 and 20 carry bevel gears 35 and 36 meshing respectively with bevel gears 37 and 38 on stand shafts 39 and 40 received in vertical bearings 41 and 42 at opposite sides of the crankshaft 12. The stand shafts 39 and 40 have bevel gears 43 and 44 at their upper ends which mesh with bevel gears 45 and 46 on the lower ends of camshaft driveshafts 47 and 48 respectively. A third drive shaft 49 has a spur gear 50 at its lower end, meshing with another spur gear 51 on the upper end of the stand shaft 39 above the bevel gear 43. The drive shafts 47, 48 and 49 extend substantially radially parallel to the axes of the three banks of cylinders. The upper ends of the drive shafts are slotted as at 50' to receive tongues 51' on the lower ends of stub shafts 52 in the engine cylinder heads 53. These stub shafts 52 are geared to the overhead camshafts 34 by the meshing engagement of bevel pinions 54 on the shafts 52 with bevel gears 55 on the camshafts. The detachable driving connection provided by the tongue and slot connection between the camshaft driveshafts and the stub shafts enables the easy removal and replacement of the cylinder heads without seriously disturbing the relation of parts of the camshaft drive.

The bearings 41 and 42 are seen to be in the form of sleeves insertible upwardly in the underside of the engine block and held in place by flanges 56 when the bearing cap 17 is secured in place. The shafts 47, 48 and 49 are similarly mounted in bearing sleeves 57 received in suitable recesses in the engine block, and positioned by flanges 58 resting on the top of the engine block. This provision enables the easy assembling and disassembling and facilitates the matter of inspection and maintenance.

The bevel gear 55 serving to drive the camshafts 34 have a sufficiently large aperture to pass over the cams 59 on the camshaft to reach the mid position illustrated in Fig. 1 from which the camshaft is driven. The gear may be passed over the shaft from either end to be secured to either one of two abutments 60 and 61, which are in the form of flanges integral with the camshaft and in proper spaced relation with respect to the bevel gears 54, so that the gears 55 will mesh properly with the gears 54 when secured to either of the two flanges fixed at either end of the shaft. In this way the camshafts of the three banks of cylinders can be made identical and by the mere interchanging of the drive gear, a camshaft may be made to serve a bank of cylinders where the shaft has to operate in a reverse direction from the operation of the other shafts, as is usually necessary in W type motors, due to the peculiar firing orders of this type of engine. Any suitable form of fastening means may be employed in securing the gear 55 to the camshaft. Bolts 62 are shown in Fig. 3 passing through the flange 61 and the gear 55. The stubshafts 19 and 20 provide convenient power take-offs for the operation of auxiliary units such as the oil pressure and scavenger pumps 63 and 64 of the engine. These are illustrated supported directly upon the bearing cap 17 and having their bevel drive gears 65 and 66 in meshing engagement with the bevel gears 35 and 36 respectively. Accessory units such as the magnetos 67 are conveniently mounted between the banks of cylinders with their drive gears 68 in meshing engagement with pinions 69 on the ends of accessory drive shafts 70 received in bearing sleeves 71, mounted in recesses in the engine block. The shafts 70 have a detachable driving connection by tongues and slots shown at 72, with the upper ends of the stand shafts 39 and 40. The bearing sleeves 71 similarly to the sleeves 41, 42 and 57 previously described, are readily insertible and removable from the engine block. In this case they are inserted through the apertures receiving the sleeves 41 and 42 from the underside of the engine block.

It will be seen that the arrangement described enables utilizing the space between the front and rear sets of cylinders necessitated by the large main middle bearing, for the projection from the crankshaft of all of the drives having connection with the crankshaft. This not only reduces the necessary overall length of the engine which is of particular advantage in an aviation engine, but also enables the driving of the camshafts from the middle, so that uneven torque is avoided and even opening and closing periods of the valves are secured. The central location further reduces the total number of gears usually required for the camshaft and accessory drives in this type of engine.

I claim:

1. In a multiple cylinder engine having a plurality of banks of cylinders, a crankshaft, camshafts for the banks of cylinders, shafts extending from the middle of the crankshaft to the middle of the camshafts, and gearing providing a driving connection between the middle of each of said camshafts and said vertical shafts and between the latter and the middle of said crankshaft, said gearing including gears capable of operation in either of two positions, to enable the turning of either of said camshafts in either direction as required.

2. In a multiple cylinder engine, a crankshaft, a camshaft, a drive shaft having a driving connection with the middle of said camshaft and the middle of said crankshaft, said cylinders having a removable crankcase, and means providing a detachable driving connection at said crankcase between said drive shaft and said crankshaft.

3. In a gear drive for a cam shaft, of an internal combustion engine, a camshaft, a gear capable of passing over the cams thereon to an intermediate position for driving the shaft from the middle, and a pair of spaced flanges on said shaft for securing said gear in either of two positions facing either end of said shaft, whereby to operate to drive the shaft in either direction as required.

4. The combination with a crankshaft of a one-piece ring gear passing over the shaft to an intermediate position between the ends of said shaft, an abutment provided on said shaft, a threaded portion on said shaft adjacent said abutment, and a split nut held together when in position holding said gear threading on the threaded portion of said shaft, and arranged to secure said gear in position alongside said abutment, a camshaft provided with a centrally positioned driving gear and driving connections between the crankshaft gear and the camshaft gear.

5. The combination with a crankshaft of a one-piece ring gear of sufficient diameter to pass over the cheeks of said crankshaft to an intermediate position between the ends of said shaft, an abutment for said gear, a threaded portion on said shaft adjacent said abutment, a two-piece gland nut fitting within said gear and held together thereby arranged to thread on said shaft and secure said gland nut in position alongside said abutment, a camshaft provided with a centrally positioned driving gear and centrally positioned driving connections between the crankshaft gear and the camshaft gear.

6. The combination with a crankshaft of a one-piece ring gear of sufficient diameter to pass over the cheeks of said crankshaft to an intermediate position between the ends of said shaft, an abutment for said gear, a threaded portion on said shaft adjacent said abutment, and a two-piece gland nut fitting within said gear and held together thereby arranged to thread on said shaft and secure said gland nut in position alongside said abutment, means for holding said gear against rotation relative to said shaft, a camshaft provided with a centrally positioned driving gear, and centrally positioned driving connections between the crankshaft gear and the camshaft gear.

7. In a gear drive for a cam shaft of an internal combustion engine, a cam shaft, a gear capable of passing over the cams on said cam shaft to an intermediate position thereon, an abutment on said cam shaft for securing said gear in position for driving the cam shaft from the intermediate position, said gear capable of passing over the cams on said cam shaft from either end of the cam shaft to be secured in a position facing either end whereby to operate to drive the cam shaft in either direction as required and driving means for said gear.

In testimony whereof I affix my signature.

GLENN D. ANGLE.